(12) United States Patent
Kawamura et al.

(10) Patent No.: US 7,953,592 B2
(45) Date of Patent: May 31, 2011

(54) SEMANTIC ANALYSIS APPARATUS, SEMANTIC ANALYSIS METHOD AND SEMANTIC ANALYSIS PROGRAM

(75) Inventors: Takahiro Kawamura, Kanagawa (JP); Kouji Ueno, Shizuoka (JP); Shinichi Nagano, Kanagawa (JP); Tetsuo Hasegawa, Tokyo (JP); Akihiko Ohsuga, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1334 days.

(21) Appl. No.: 11/362,224

(22) Filed: Feb. 27, 2006

(65) Prior Publication Data
US 2007/0073680 A1    Mar. 29, 2007

(30) Foreign Application Priority Data

Sep. 29, 2005 (JP) ................. 2005-283477

(51) Int. Cl.
*G06F 17/27* (2006.01)
*G06F 7/00* (2006.01)
*G06F 17/30* (2006.01)

(52) U.S. Cl. ................. 704/9; 707/708; 707/771
(58) Field of Classification Search ........ 704/9; 707/708, 707/771
See application file for complete search history.

(56) References Cited

U.S. PATENT DOCUMENTS

| 6,487,545 | B1 | 11/2002 | Wical |
| 7,027,974 | B1* | 4/2006 | Busch et al. ............ 704/4 |
| 7,043,492 | B1* | 5/2006 | Neal et al. ............ 1/1 |
| 7,493,253 | B1* | 2/2009 | Ceusters et al. ............ 704/9 |
| 2004/0010483 | A1 | 1/2004 | Brands et al. |
| 2005/0138018 | A1* | 6/2005 | Sakai et al. ............ 707/3 |

FOREIGN PATENT DOCUMENTS

| JP | 2001-325284 | 11/2001 |
| JP | 2005-182280 | 7/2005 |

OTHER PUBLICATIONS

Urata, K. et al., "A Multimodal Help System Based on Question Answering Technology," Information Processing Society of Japan Technical Report, Digital Document, No. 36, pp. 23-29, (2004).
Office Action mailed Aug. 18, 2009 in Japanese Patent Application No. 2005-283477.

* cited by examiner

*Primary Examiner* — David R Hudspeth
*Assistant Examiner* — Samuel G Neway
(74) *Attorney, Agent, or Firm* — Finnegan, Henderson, Farabow, Garrett & Dunner, L.L.P.

(57) ABSTRACT

A semantic analysis apparatus includes a data obtaining unit that obtains data in which an item name and an item value belonging to the item name are represented in a predetermined data format; an item value extracting unit that extracts the item value from the data based on the data format; a concept storing unit that stores a concept which is a semantic notion to be attached to the item name and an instance which is specific data of the concept in association with each other; a concept specifying unit that specifies the concept, which is stored in the concept storing unit and which is associated with the instance which at least partially matches with a character string of the extracted item value, as the concept for the item name; and an associating unit that associates the concept with the item name.

16 Claims, 8 Drawing Sheets

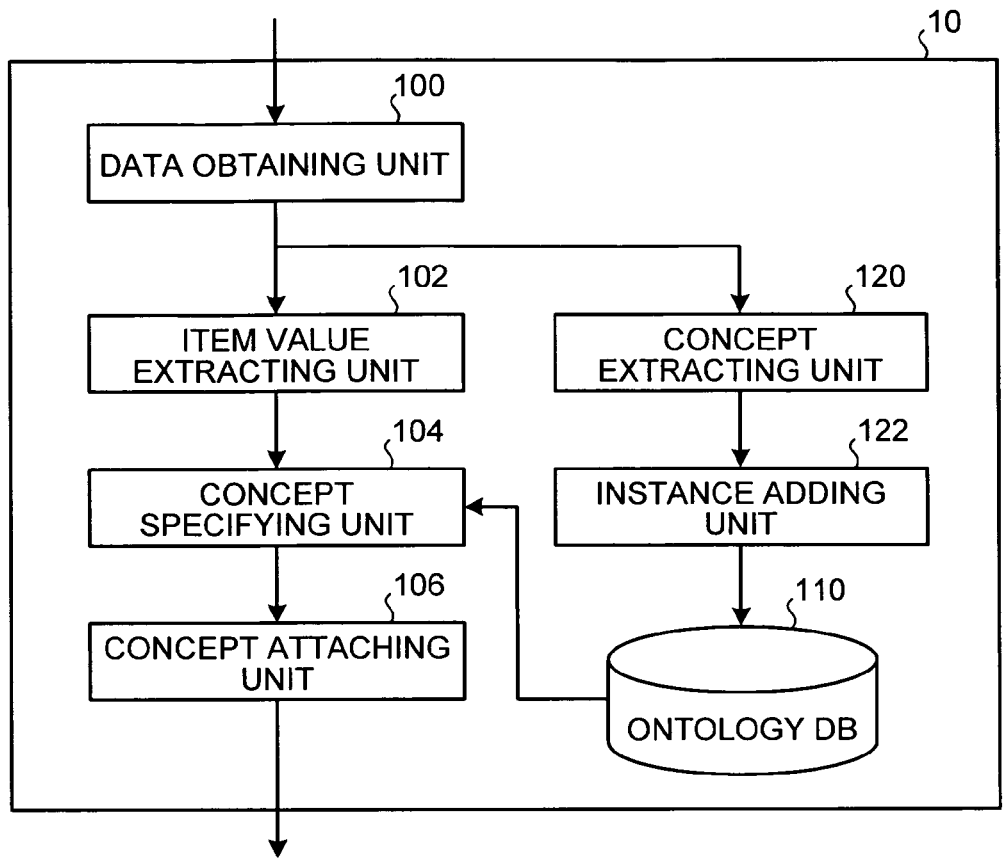

| ATTRIBUTE | CONCEPT (CLASS) |
|---|---|
| has Color | Wine Color |
| has Body | Wine Boby |
| ⋮ | ⋮ |

114

SEMANTIC ANALYSIS APPARATUS, SEMANTIC ANALYSIS METHOD AND SEMANTIC ANALYSIS PROGRAM

CROSS-REFERENCE TO RELATED APPLICATIONS

This application is based upon and claims the benefit of priority from the prior Japanese Patent Application No. 2005-283477, filed on Sep. 29, 2005; the entire contents of which are incorporated herein by reference.

BACKGROUND OF THE INVENTION

1. Field of the Invention

The present invention relates to a semantic analysis apparatus, a semantic analysis method, and a semantic analysis program, according to which meaning of a term used in a sentence of natural language is analyzed.

2. Description of the Related Art

Conventionally, researches have been widely carried out on natural language processing, in particular on semantic analysis. In the natural language processing, meaning of words used in sentences of natural language is analyzed. An ultimate goal of such researches is to bring out a computer which understands human language.

For example, according to one semantic class analysis technology, sentences written on a target subject are analyzed based on a morpheme dictionary featuring 280,000 words and properties, i.e., 106 kinds of semantic classes and definitions of co-occurring words, included in the morpheme dictionary (see, for example, "A MultiModal Help System based on Question Answering Technology" Information Processing Society of Japan Technical Report, Digital Document, No. 36, 2004).

Further, according to processing disclosed in Japanese Patent Application Laid-Open No. 2001-325284, for example, only a table is set as an analysis target, and a class is determined based on an instance with the use of ontology. Thus, an attribute name region and an attribute value region are extracted. Another disclosed technique allows for classification of words based on the ontology (see, for example, U.S. Pat. No. 6,487,545).

The conventional techniques as described above, however, are disadvantageous in that they carry out the semantic analysis generally at the relevance ratio as low as 60 to 70%. Furthermore, a rule creation and maintenance thereof are complicated.

SUMMARY OF THE INVENTION

According to one aspect of the present invention, a semantic analysis apparatus includes a data obtaining unit that obtains data in which an item name and an item value belonging to the item name are represented in a predetermined data format; an item value extracting unit that extracts the item value from the data based on the data format; a concept storing unit that stores a concept which is a semantic notion to be attached to the item name and an instance which is specific data of the concept in association with each other; a concept specifying unit that specifies the concept, which is stored in the concept storing unit and which is associated with the instance which at least partially matches with a character string of the extracted item value, as the concept for the item name; and an associating unit that associates the concept with the item name.

According to another aspect of the present invention, a semantic analysis method includes obtaining data in which an item name and an item value belonging to the item name are represented in a predetermined data format; extracting the item value from the data based on the data format of the obtained data; specifying a concept, which is stored in the concept storing unit, and which is associated with an instance which at least partially matches with a character string of the extracted item value, as the concept for the item name, the concept storing unit storing a concept which is a semantic notion to be attached to the item name and an instance which is specific data of the concept in association with each other; and associating the concept with the item name.

According to still another aspect of the present invention, a computer program product has a computer readable medium including programmed instructions for performing a semantic analysis process. The instructions, when executed by a computer, cause the computer to perform obtaining data in which an item name and an item value belonging to the item name are represented in a predetermined data format; extracting the item value from the data based on the data format of the obtained data; specifying a concept, which is stored in the concept storing unit, and which is associated with an instance which at least partially matches with a character string of the extracted item value, as the concept for the item name, the concept storing unit storing a concept which is a semantic notion to be attached to the item name and an instance which is specific data of the concept in association with each other; and associating the concept with the item name.

BRIEF DESCRIPTION OF THE DRAWINGS

FIG. 1 is a block diagram of a structure of a semantic analysis apparatus according to one embodiment of the present invention;

FIG. 2 shows a data structure of a concept correspondence table stored in ontology database (DB);

DETAILED DESCRIPTION OF THE INVENTION

Figures 3, 4:
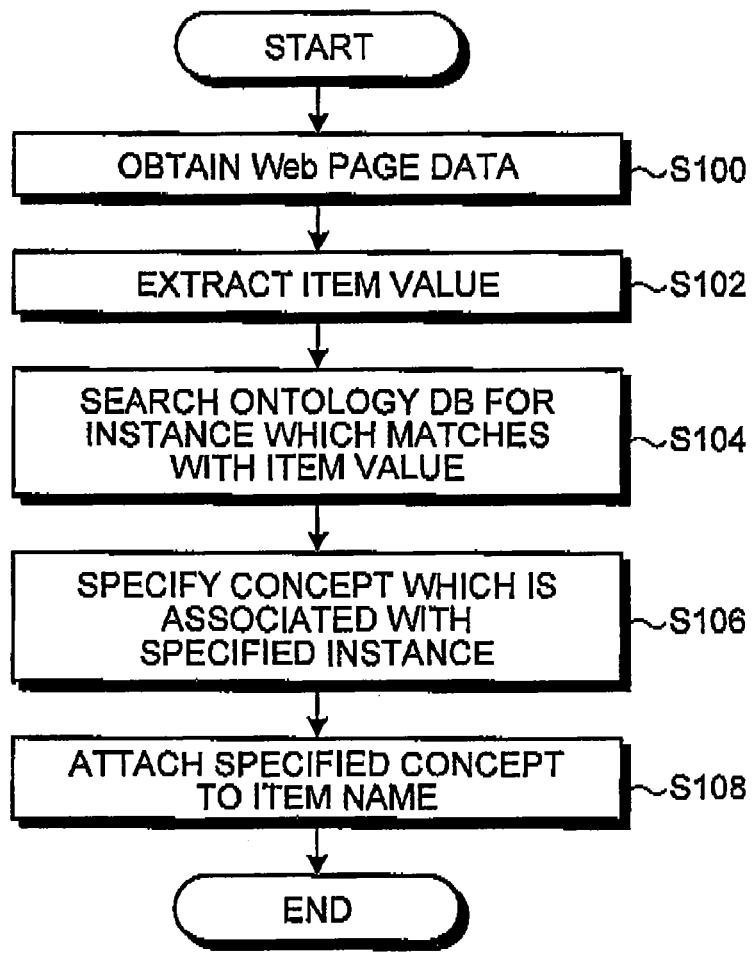
FIG. 3 shows a data structure of a conceptualization table stored in the ontology DB.
FIG. 4 is a flowchart of a semantic analysis process by the semantic analysis apparatus according to the present invention.

Hereinafter, an embodiment of a semantic analysis apparatus, a semantic analysis method, and a semantic analysis program according to the present invention will be described in detail with reference to the accompanying drawings. It should be noted that the present invention is not limited to the embodiment.

FIG. 1 is a block diagram of a structure of a semantic analysis apparatus 10. The semantic analysis apparatus 10 includes a data obtaining unit 100, an item value extracting unit 102, a concept specifying unit 104, a concept attaching unit 106, an ontology database (DB) 110, a concept extracting unit 120, and an instance adding unit 122.

The semantic analysis apparatus 10 generates data in an extensible Markup Language (XML) in a Resource Description Framework (RDF) format from data represented in a predetermined data format.

The data obtaining unit 100 obtains data from outside, and converts the obtained data into an internal format to be handled in the semantic analysis apparatus 10. The data obtained from outside is subjected to the semantic analysis process. When obtained from outside, the data is semi-structured and represented in a predetermined data format. Specifically, the data has a format in which an item name, a colon ":", and an item value are described sequentially in this order, as "item name: item value".

The data obtaining unit 100 obtains data in a Hyper Text Markup Language (HTML) represented in the data format as described above, or meta data represented in a table format. The meta data to be obtained includes at least one combination of the item name and the item value described in the data format as described above.

When the data is represented in a predetermined data format, such format does not limit a syntax of the data but a semantic structure of the data. Therefore, actual data may be represented in a table format other than the text format. For example, the employed data format may be the table format consisting of two rows. In this case, the item name may appear in the left-side row of the two rows, whereas the item value may appear in the right-side row of the two rows.

The item value extracting unit 102 extracts an item value from a Web page obtained by the data obtaining unit 100. More specifically, the item value extracting unit 102 extracts the item value by searching for a colon based on the above-described data format and extracting content described immediately after the found colon as the item value.

The ontology DB 110 stores ontology. Here, the "ontology" means a representation of a target world given as a model expressed by a certain knowledge representation language. The embodiment described herein is based on an assumption that the ontology may be represented by, for example, a Web Ontology Language (OWL) whose standardization is underway by the World Wide Web Consortium (W3C). In other words, the use of more detailed ontology, such as a role in a specific situation, should not be considered. Here, the ontology DB 110 serves to store the concept (concept storing unit).

Specifically, the ontology DB 100 stores a plurality of concepts. The "concept" means a semantic notion of the data. The ontology DB 110 further stores an attribute, which is a piece of information indicating a relation between the concepts. Such inter-concept relation may be classified into: a "part of" relation, i.e., where a concept A is a part of a concept B; a "is a" relation, i.e., where the concept A is one type of the concept B; an "instance of" relation, i.e., where the concept A is an abstraction of the concept B, or the like.

The concept specifying unit 104 refers to the ontology DB 110, and specifies the concept of an item name which corresponds to the item value extracted by the item value extracting unit 102. Here, the concept specifying unit 104 limits a search target, i.e., a range of concepts to be searched for specification based on a predetermined condition. In other words, the concept specifying unit 104 serves to specify the search target (search target specifying unit).

The concept attaching unit 106 attaches the concept specified by the concept specifying unit 104 to the item name. In other words, the concept attaching unit 106 associates the item name with the concept. Specifically, the concept attaching unit 106 describes the concept in the XML format of the RDF and outputs the item name together with the attached concept. In other words, the concept attaching unit 106 serves to attach a concept (concept attaching unit).

The concept extracting unit 120 extracts a concept from the data obtained by the data obtaining unit 100. The instance adding unit 122 newly adds an item value included in the data obtained by the data obtaining unit to the ontology DB 110 as an instance based on the concept extracted by the concept extracting unit 120.

Here, the instance adding unit 122 serves to search for a concept in the ontology DB 110 (concept searching unit), to search for an instance in the ontology DB 110 (instance searching unit), and to add an instance (instance adding unit).

FIG. 2 shows a data structure of a concept correspondence table 112 stored in the ontology DB 110. The concept correspondence table 112 includes concept (class) fields, instance fields, and attribute fields.

In the concept field, the concept to be attached to the item name is stored. In the instance field, specific data included in a corresponding concept is stored. For example, for the concept "Wine Color", specific data of the "Wine Color" such as "Red", "Rose", and "White" are stored in the instance field. The concept can be regarded as data representing the class of the instance.

In the attribute field, the attribute of the concept is stored. The attribute stored in the attribute field corresponding to the pertinent concept is, in other words, the data indicating a relation between the pertinent concept and another concept. In the attribute field, a specific attribute of each concept is also stored in addition to the attribute indicating the above-described relation such as the "part of" relation and the "is a" relation.

For example, as the attribute to the concept "Wine", the attribute "has Color" is stored in the attribute field. This attribute is specific to the concept "Wine" and indicates that the concept "Wine" has the concept "Color". Herein, the concept "Wine" and the attribute "has Color" are in relation of the subject and the predicate. Further, each of the instances "Red", "Rose", and "White" associated with the concept "Wine Color" is the object in the above-mentioned relation of "Wine" and "has Color."

Most of the data to be processed by the semantic analysis apparatus 10 has a content corresponding to a triplet structure of the subject, the predicate, and the object. In view of such characteristic, data indicating the association of the concept and the attribute is previously stored as described above so as to allow for the analysis of the relation among the subject, the predicate, and the object.

Further, a property can be specified. Here, the "property" means a conceptualization of the predicate represented as the attribute. Specifically, the ontology DB 110 further stores a conceptualization table 114 in which the attribute is associated with the property, which is a conceptualization of the pertinent attribute.

FIG. 3 shows a data structure of the conceptualization table 114 stored in the ontology DB 110. The conceptualization table 114 includes the attribute fields and the concept fields.

An attribute stored in the concept correspondence table 112 may be a predicate when the concept which is associated with this attribute is taken as a subject. Further, such predicate may be treated as a concept via conceptualization. The conceptualization table 114 is employed for a processing of such conceptualization. In other words, the conceptualization table 14 stores an attribute which is a predicate, and a concept which can be obtained via conceptualization of the attribute, in association with each other.

For example, the attribute "has Color" is associated with the concept "Wine Color". Further, the attribute "has Body" is associated with the concept "Wine Body".

Figure 5:
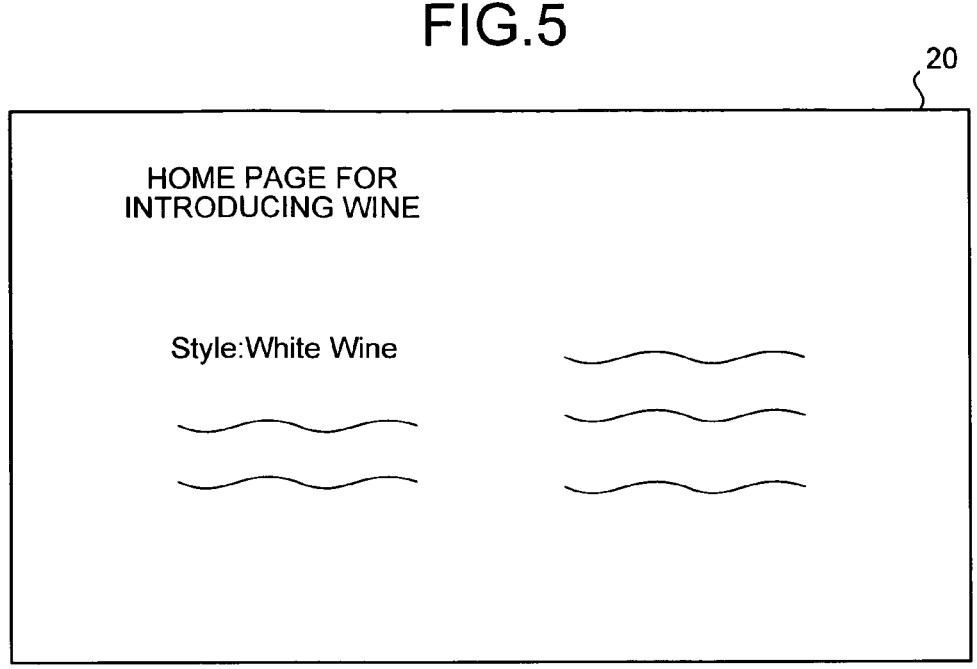
FIG. 5 shows a Web page, which is a target of the semantic analysis process.

FIG. 4 is a flowchart of the semantic analysis process by the semantic analysis apparatus 10. First, the data obtaining unit 100 obtains a Web page (step S100). FIG. 5 shows a Web page 20 which is a target of the semantic analysis process. The Web page 20 of FIG. 5 includes a description "Style: White Wine". In this manner, the item name and the item value are associated with each other by the colon ":" in the Web page 20.

Returning to FIG. 4, after the Web page 20 is obtained, the item value extracting unit 102 extracts the item value from the obtained Web page 20 based on the data format (step S102). Then, the concept specifying unit 104 searches the ontology DB 110 for an instance which matches with the extracted item value (step S104).

In the instance search, the concept specifying unit 104 compares the extracted item value and each of instances stored in the ontology DB 110. An order of comparison of the instances is determined based on the attribute of the concept.

For example, when the concept has the attribute indicating the "is a" relation, the search starts from an upper level concept. When the relation is described as "Concept A is a concept B," the upper level concept is concept B.

When the concept has the attribute indicating the "part of" relation, for example, the search starts from a concept indicating the whole. When the relation is described as "Concept A is a part of concept B," the concept indicating the whole is concept B.

When the concept has the attribute indicating the "instance of" relation, for example, the search starts from an abstract concept. When the relation is described as "Concept A is an instance of concept B," the abstract concept is concept B.

The upper level concept in the "is a" relation, the concept indicating the whole in the "part of" relation, and the abstract concept in the "instance of" relation will be hereinafter referred to as major concepts. On the other hand, the lower level concept in the "is a" relation, the concept indicating a part in the "part of" relation, and the non-abstract concept in the "instance of" relation will be referred to as minor concepts. In other words, the major concept is, in general, a concept which has less instances associated therewith and less equal level concepts than the minor concept.

Thus, the numbers of concepts and instances associated with the major concept are smaller than those associated with the minor concept. Hence, the processing load can be reduced when the search starts from the major concept.

When the concept specifying unit 104 detects an instance which matches with the extracted item value during the search of the major concepts, the concept specifying unit 104 refers to the attribute of the property corresponding to the detected instance, and continues instance detection by sequentially searching for a property which can be regarded as the minor concept of the pertinent property. Eventually, the concept specifying unit 104 specifies a property of a minor concept of the lowest level (step S106).

Thus, the sequential search starting from the major concept down to the minor concept enables a high-speed search. Here, a property which is treated as a minor concept is a further ramified concept. Therefore, such property can be considered to be a property, which is most suitable for the item name. Hence, such a property which is a minor concept of the lowest level is specified in the embodiment.

Once the property is specified, the concept attaching unit 106 attaches the specified property to the item value (step S108). Thus, the semantic analysis process by the semantic analysis apparatus 10 ends.

Figure 6:
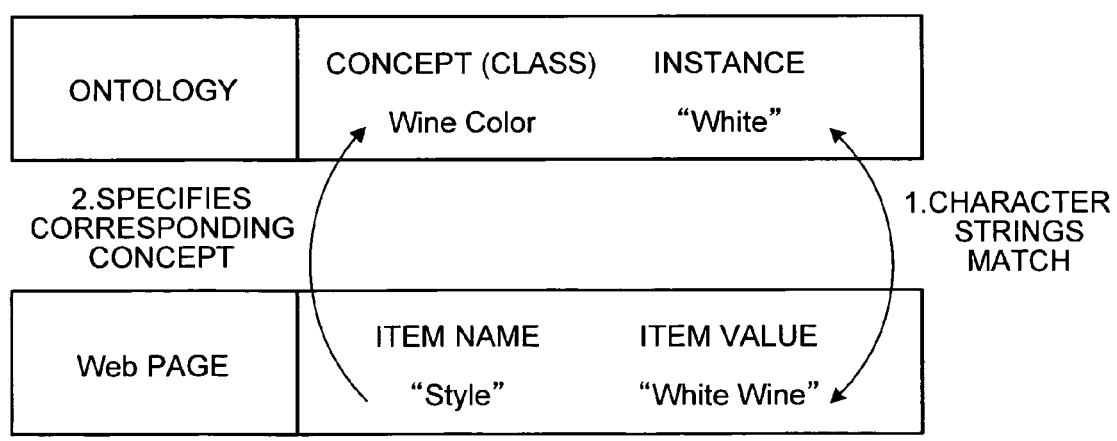
FIG. 6 is a diagram for explaining the semantic analysis process.

FIG. 6 is a diagram for explaining the semantic analysis process. FIG. 6 shows an example of the semantic analysis process on the Web page 20 shown in FIG. 5. In the Web page 20, the item value "White Wine" which appears immediately after the colon is extracted as the item value in the step S102. Then, the concept specifying unit 104 searches the concept correspondence table 112 for an instance, which includes a character string that matches with a character string in the item value by a predetermined amount. Consequently, the concept specifying unit 104 detects the instance "White" as a match. Here, the term "match" means a complete match or a partial match.

On the other hand, the concept specifying unit 104 traces down minor concepts while referring to attributes of the detected instance, and specifies an instance corresponding to the minor concept of the lowest level. Here, the concept specifying unit 104 also searches for a concept which is a conceptualization of the attribute while referring to the conceptualization table 114.

Further, a concept which is associated with the instance of the specified minor concept is specified from the concept correspondence table 112. In the example here, the concept "Wine Color" is specified. In other words, the concept of the item name "Style" associated with "White Wine" extracted as the item value is specified.

Then, the concept "Wine Color" is attached to the item name "Style". Specifically, as a result of the process, the description of the Web page 20 becomes:

<Wine Color> Style <Wine Color>: White Wine.

Then, the data is output to outside.

In such a manner, when a semi-structured data is the process target, a semantic notion thereof may be judged more precisely with the use of a structured portion thereof, i.e., the colon ":" in this embodiment.

The use of the above described embodiment, however, may be limited since the employable data format is limited compared with an apparatus that employs a free sentence. However, most of bar codes and meta data referred to in Radio Frequency Identification (RFID), which is expected to become more popular, are essentially represented in such data format, in other words, a format in a binary relation in which the data itself is the subject. Hence, practical versatility of the above described apparatus is high.

Figure 7:
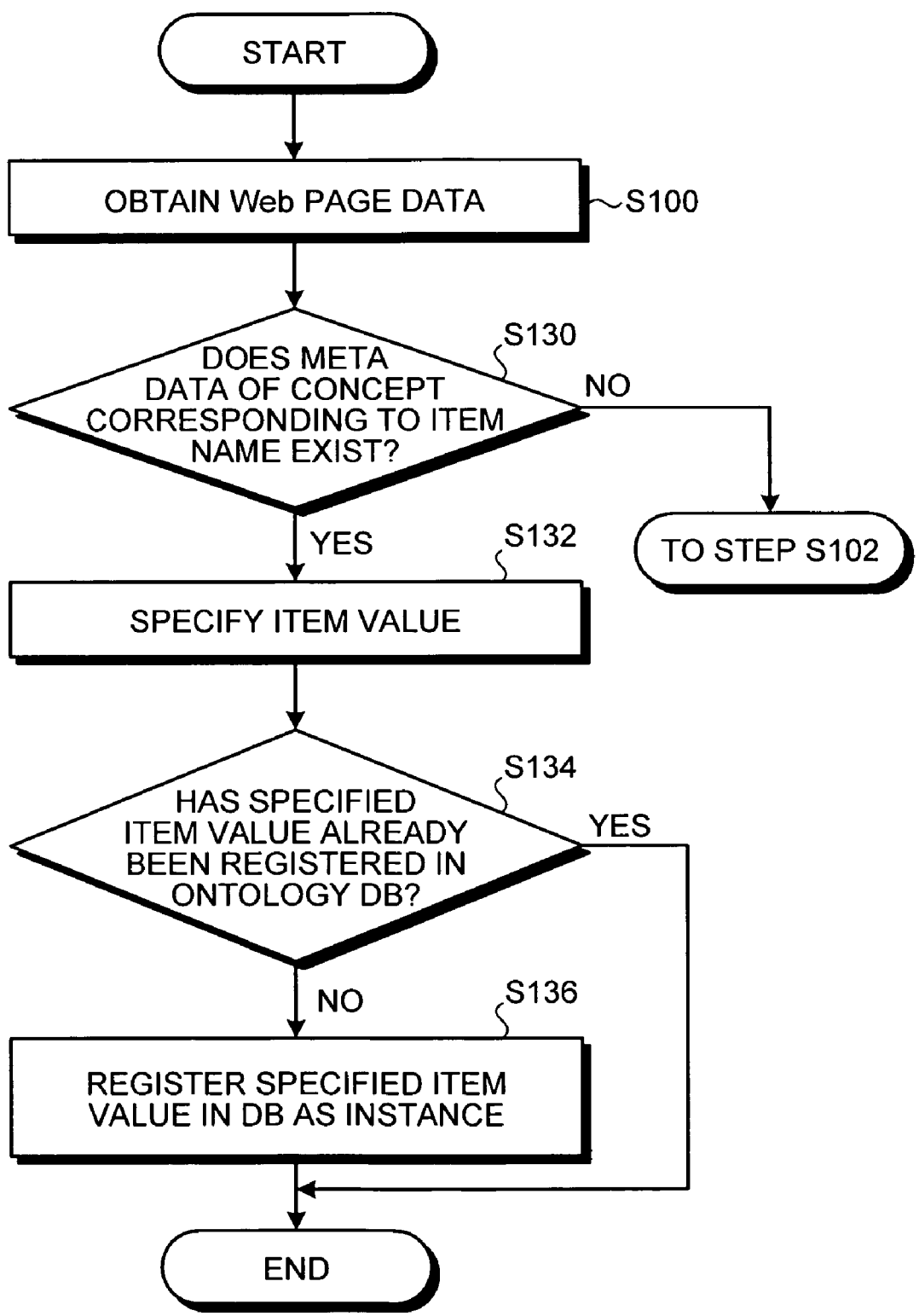
FIG. 7 is a flowchart of the semantic analysis process which is performed when meta data indicating a concept of an item name is attached to the Web page.

FIG. 7 is a flowchart of the semantic analysis process performed when the Web page 20 includes meta data indicating the concept of the item name. The data obtaining unit 100 obtains the Web page 20 (step S100). Then, the concept extracting unit 120 searches for the meta data indicating the concept of each of the item names included in the Web page 20 obtained by the data obtaining unit 100. When the meta data of the concept exists (Yes in step S130), the item value corresponding to the item name, the concept of which is specified by the meta data, is specified (step S132). On the other hand, when the meta data of the concept does not exist (No in step S130), the process proceeds to the item value extraction described in FIG. 4 (step S102).

After the item value is specified in the step S132, the instance adding unit 122 searches the ontology DB 110 for the instance which matches with the specified item value. Here, the search targets are only the instances which are associated with the concept provided as the meta data.

When the instance which matches with the item value is not detected from the ontology DB 110, in other words, when an instance corresponding to the item value extracted from the Web page 20 is not registered in the ontology DB 110 (No in step S134), the item value is newly registered in the concept correspondence table 112 as the instance (step S136). Specifically, the item value is registered as the instance which corresponds to the concept of the item name associated with the item value. On the other hand, when the instance which matches with the item value is detected from the ontology DB 110 (step S134), the process ends.

Figure 8:
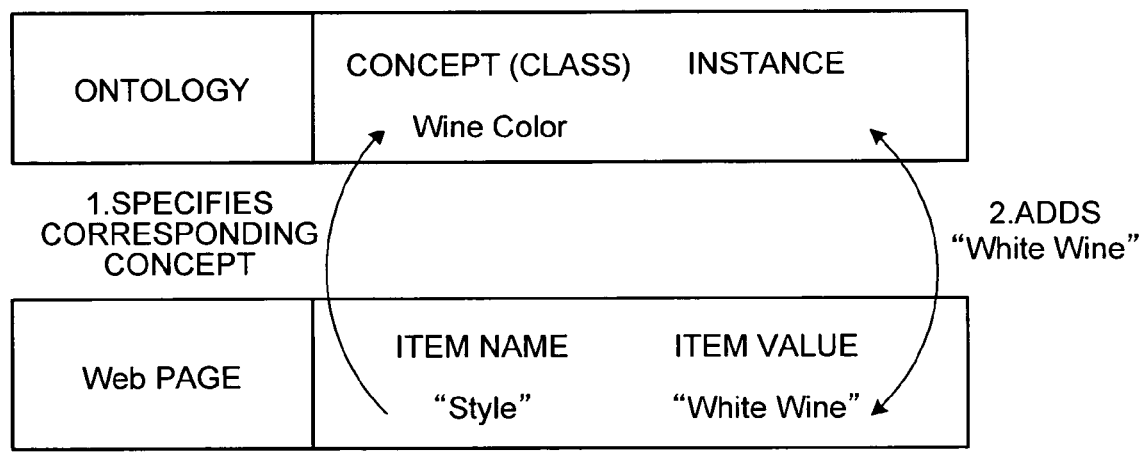
FIG. 8 shows an example of the semantic analysis process of FIG. 7 on the Web page of FIG. 5.

FIG. 8 shows an example of the semantic analysis process of FIG. 7 performed on the Web page 20 of FIG. 5. Suppose that the meta data is attached to the Web page 20. The meta data is the data indicating that the concept of the item name "Style" described in the Web page 20 is the concept "Wine Color".

In this case, the concept that matches with the concept "Wine Color" of the item name "Style" is specified from the ontology DB 110 based on the meta data. Then the concept "Wine Color" in the concept correspondence table 112 is specified.

Further, the item value "White Wine" associated with the item name "Style" is searched from among the instances associated with the concept "Wine Color". Since the item name "White Wine" is not included in the instances, the instance "White Wine" is registered as a new instance for the concept "Wine Color".

When the instance, which is not registered in the ontology DB 110, is specified in the semantic analysis process of the Web page 20 as described above, the instance is newly registered in the ontology DB 110, so that the ontology stored in the ontology DB 110 is expanded and the newly registered instance can be used in a subsequent semantic analysis.

Figure 9:
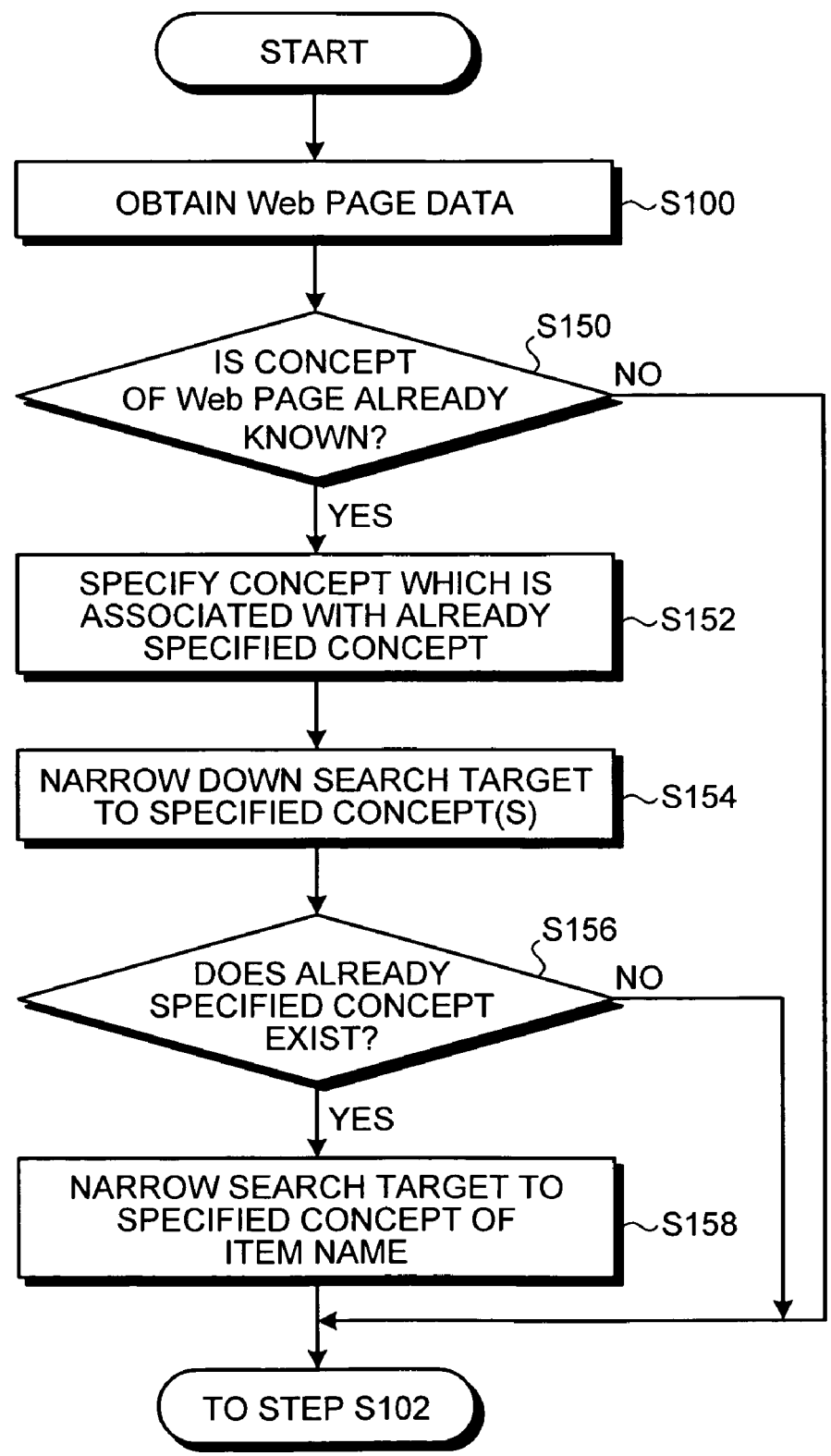
FIG. 9 is a flowchart of the semantic analysis process which is performed when the concept of the Web page is already known.

FIG. 9 is a flowchart of the semantic analysis process performed when the concept of the Web page is already known. In FIG. 8, the concept for the item name is attached as the meta data, whereas in FIG. 9 the concept of the Web page 20 itself is already known. In other words, in the case shown in FIG. 9, the concept which is the subject of the meta data, i.e., the concept of the Web page 20 is already known.

The concept of the Web page 20 is already known, when, for example, the Web page 20 is known to correspond to a predetermined concept in advance from a Uniform Resource Locator (URL) of the Web page 20. Here, it is assumed that the information on the correspondence between the URL and the concept is previously registered in the ontology DB 110 of the semantic analysis apparatus 10. In other words, the ontology DB 110 serves to store the concept of the obtained data (obtained data concept storing unit).

Alternatively, the concept for the item name may be described in the meta data of the Web page 20. In this case, the concept described in the meta data is extracted.

When the concept in the Web page 20 obtained by the data obtaining unit 100 is already known (Yes in step S150), the attribute associated with the known concept in the concept correspondence table 112 and the concept associated with the attribute in the conceptualization table 114 are looked up to, and the concept having a certain relation with this concept is specified (step S152).

More specifically, only the concept which corresponds to the minor concept of the lower level than the pertinent concept is specified. Specifically, when the "is a" relation with other concept is stored as the attribute of the concept, a subordinate concept thereof is specified. Further, when the "part of" relation with other concept is stored as the attribute of the concept, a concept indicating the part is specified. Further, when the "instance of" relation is stored, a non-abstract concept is specified.

Then, in the ontology DB 110, the detection target in the instance detection, which is the detection of the instance that matches with the item value extracted from the Web page 20, is limited to the concepts specified in the step S152 (step S154). When the concept of the Web page is known in advance as in the case described above, accuracy of the semantic analysis can be improved since the concept to be searched is limited based on this concept.

Following a search target narrowing process (step S154), the semantic analysis process is performed on the item name already included in the Web page 20, and once the concept is specified (Yes in step S156), the concept having a certain relation with the specified concept is specified, and the detection target is narrowed down to the specified concepts (step S158). On the other hand, when the semantic analysis process for the Web page 20 is not yet performed (No in step S156), the process proceeds to the item extracting process (step S102).

In this manner, if the concept for another item name is known in advance by the semantic analysis process already performed on the same Web page, accuracy of the semantic analysis can be improved by limiting the concept to be searched in the concept search for the item name, to which the semantic analysis is to be performed based on this concept.

Figure 10:
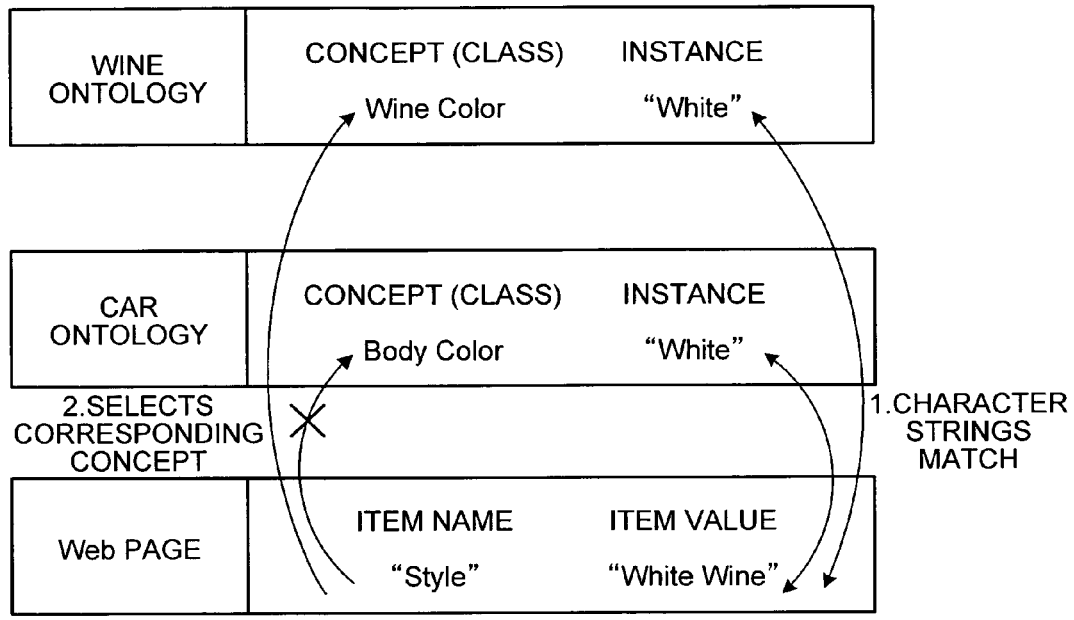
FIG. 10 shows an example of a process of steps S150 to S154 of FIG. 9 on the Web page of FIG. 5.

FIG. 10 shows an example of the process of steps S150 to S154 described with reference to FIG. 9, on the Web page 20 shown in FIG. 5. Suppose that it is known that the Web page 20 is the page about wine from the URL of the Web page 20. In this case, only the minor concepts of the concept "Wine" among the concepts stored in the ontology DB 110 are the search targets.

Suppose that in the ontology DB 110, the instance, which matches with the item value "White Wine," is included both in the instances corresponding to the concept "Wine Color" and in the instances corresponding to the concept "Body Color".

Since narrowing of the search target concept described with reference to FIG. 9 is performed, the concept "Body Color" is not included in the search targets. Therefore, only the concept "Wine Color" is specified from the ontology DB 110.

By specifying the search target in this manner, it is able to avoid erroneously specifying the concept "Body Color".

Figure 11:
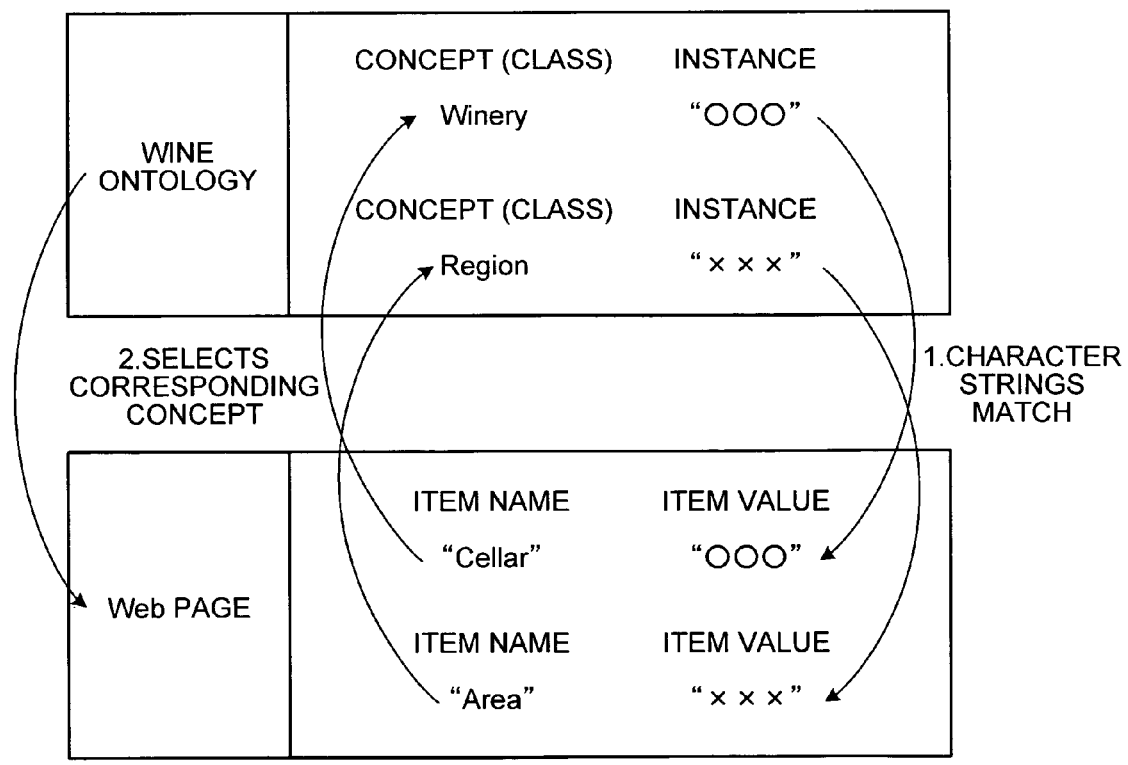
FIG. 11 shows an example of a process of steps S156 and S158 of FIG. 9 on the Web page of FIG. 5.
Figure 12:
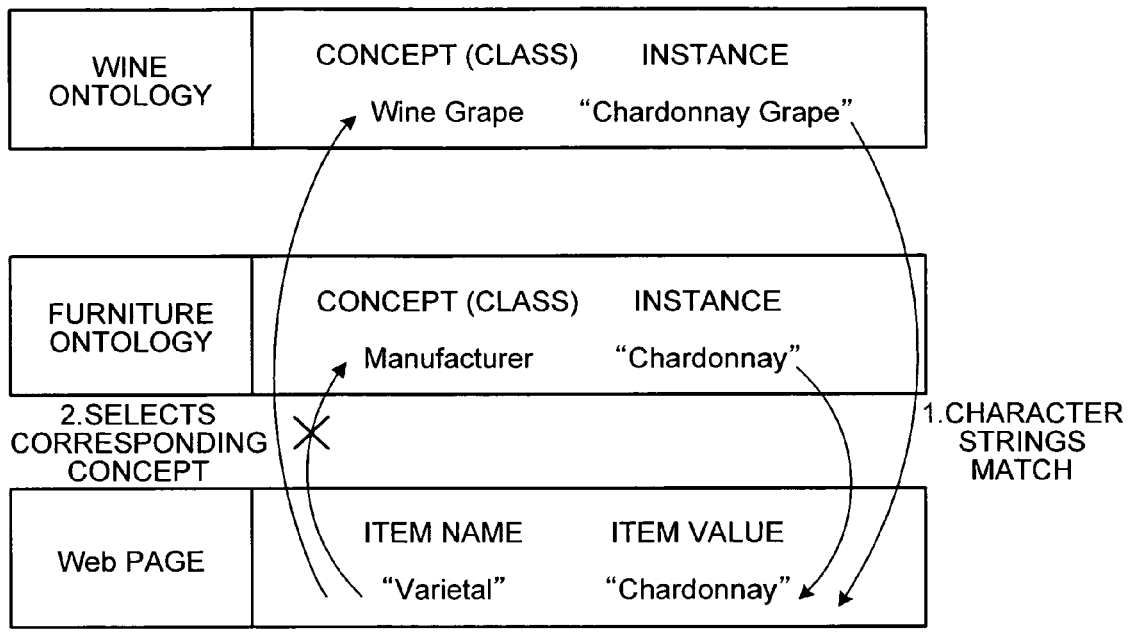
FIG. 12 shows an example of the process of steps S156 and S158 of FIG. 9 on the Web page of FIG. 5.

FIGS. 11 and 12 show examples of a process of steps S156 and S158 described with reference to FIG. 9 performed on the Web page 20 shown in FIG. 5. For example, suppose that the instance which matches with the item value "○○○" extracted from the description "Cellar: ○○○" of the Web page 20 is detected in the ontology DB 110, and the concept, which corresponds to the item name "Cellar," is specified as the concept "Winery", as shown in FIG. 11.

Further, suppose that the instance which matches with the item value "xxx" extracted from the description "Area: xxx" of the Web page 20 is detected in the ontology DB 110, and the concept, which corresponds to the item name "Area," is specified as the concept "Region".

In this case, from the concepts "Winery" and "Region" specified for the same Web page 20, the concept, which corresponds to the major concept thereof, is supposed. In this case, the concept of the Web page 20 is supposed to be the concept "Wine". The concepts to be searched can be narrowed down according to the supposed concept. In other words, only the minor concepts of the concept "Wine" will be searched.

Specifically, after the concept of the Web page 20 is specified to be the concept "Wine," the concept for the item name in the description "Varietal: Chardonnay" included in the Web page 20 is specified, as shown in FIG. 12.

As the concept whose instance is the item value "Chardonnay" that corresponds to the item name "Varietal", the concepts "Wine Grape" and "Manufacturer" are specified. However, since the concept of the Web page 20 is supposed to be the concept "Wine" as described above, only the minor concepts of the concept "Wine" are searched.

Therefore, only the instances, which correspond to the concept "Wine Grape," are detected. Further, the concept "Wine Grape" is specified as the concept of the item name "Varietal". As described above, it is able to avoid performing a wrong semantic analysis by specifying the search target.

Such a mode of use is preferable when a plurality of item names including the item name to which the semantic analysis is difficult to be performed is included in the Web page 20. In this case, the semantic analysis is first performed on an item name, for which the concept is easily specified, among the plurality of item names. Then, the concept of the Web page 20 is supposed based on the specified concept. Thereafter, the semantic analysis to other item names included in the Web page 20 is performed with the minor concepts of the supposed concept as the search target. Thereby the search target is limited, and the semantic analysis can be performed to the item name, for which the semantic analysis is difficult to be performed, with higher accuracy.

Specifically, suppose that a type of engine, a size of tire, and the like are specified as the properties by the semantic analysis of the item name in the Web page 20. In this case, it is supposed that the Web page 20 is about a car, and, the Web page 20 is assumed to have the "car" as the property thereof.

Further, as shown in FIG. 11, the concept already specified in the semantic analysis of the item name in the same Web page 20 can be excluded from the search target. Thereby, the semantic analysis can be performed with higher accuracy.

In the above-described specific example, the type of engine and the size of tire are already specified. Hence, in a subsequent semantic analysis, the minor concepts which correspond to the property of the car, and which is the property other than the type of engine and the size of tire, are selected as the search target.

Figure 13:
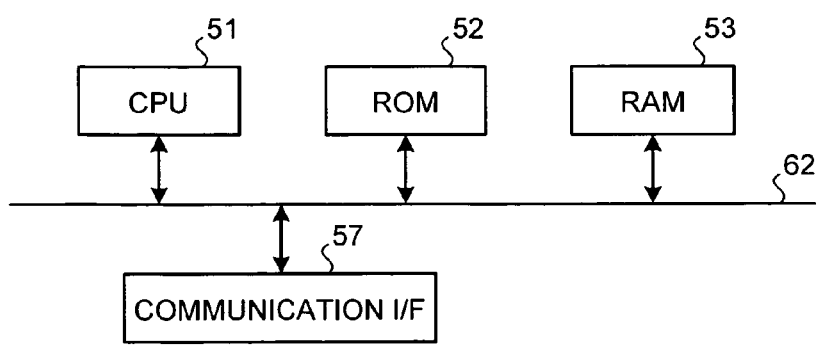
FIG. 13 is a diagram of a hardware structure of the semantic analysis apparatus according to one embodiment of the present invention.

FIG. 13 shows a hardware structure of the semantic analysis apparatus 10. The semantic analysis apparatus 10 includes, as a hardware structure, a Read Only Memory (ROM) 52 in which a semantic analysis program for executing the semantic analysis process in the semantic analysis apparatus 10 or the like is stored, a Central Processing Unit (CPU) 51 which controls each of the units of the semantic analysis apparatus 10 according to the program in the ROM 52, a Random Access Memory (RAM) 53 which stores various data required for the control of the semantic analysis apparatus 10, a communication Interface (I/F) 57 which is connected to a network for communication, and a bus 62 which connects the respective units.

The above-mentioned semantic analysis program in the semantic analysis apparatus 10 may be recorded in a computer readable recording medium, such as a Compact Disc Read Only Memory (CD-ROM), a Floppy (registered trademark) Disc (FD), a Digital Versatile Disk (DVD) or the like, as an installable or an executable file, and provided.

In this case, in the semantic analysis apparatus 10, the semantic analysis program is read out from the above-mentioned recording medium and executed to be loaded to a main memory, so that each of the units described in the above software structure is generated on the main memory.

Further, the semantic analysis program of the embodiment may be configured to be stored in a computer connected to a network such as the Internet, and to be provided by being downloaded via the network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semantic analysis apparatus comprising:
a central processing unit;
a data obtaining unit that obtains data in which an item name and an item value belonging to the item name are represented in a predetermined data format;
an item value extracting unit that extracts the item value from the data based on the data format;
a concept specifying unit that selects and specifies a concept, which is stored in a concept storing unit, and which is associated with an instance which at least partially matches with a character string of the extracted item value, as the concept for the item name, the concept storing unit storing concepts and instances in association with each other; and
an associating unit that associates the concept with the item name;
wherein the concept is a semantic notion to be attached to the item name and the instance is specific data of the concept, and wherein the concept specifying unit determines an order of comparison of the concepts based on the attributes which are associated with the concepts in the concept storing unit, compares the instance which is associated with one of the concepts in the concept storing unit and the item value which is extracted by the item value extracting unit according to the order of comparison, and specifies the instance which is identical to the item value, and wherein the concept storing unit further stores attributes associated with the concepts, including an attribute indicating a relation between a first concept and a second concept of the concepts.

2. The semantic analysis apparatus according to claim 1, wherein
the attribute indicates an upper-lower relation between the first concept and the second concept, in association with the concept, and
the concept specifying unit determines an order from an upper level to a lower level of the upper-lower relation as the order of comparison based on the attributes which are made associated with the concept in the concept storing unit.

3. The semantic analysis apparatus according to claim 1, wherein
the attribute indicates a whole-part relation, which indicates a relation between a whole and a part of the whole, between the first concept and the second concept, and
the concept specifying unit determines an order from the whole to the part of the whole-part relation as the order of comparison based on the attributes which are made associated with the concept in the concept storing unit.

4. The semantic analysis apparatus according to claim 1, wherein the attribute indicates an abstract-concrete relation between the first concept and the second concept, in association with the concept, and the concept specifying unit determines an order from the abstract to the concrete in the abstract-concrete relation as the order of comparison based on the attributes which are made associated with the concept in the concept storing unit.

5. The semantic analysis apparatus according to claim 1, wherein the attribute indicates an upper-lower relation between the first concept and the second concept, in association with the concept, and the concept specifying unit specifies the concept of a lower level, when a plurality of concepts are associated with the instance which is identical to the item value and the plurality of concepts are in the upper-lower relation.

6. The semantic analysis apparatus according to claim 1, wherein the attribute indicates a whole-part relation, which indicates a relation between a whole and a part of the whole, between the first concept and the second concept, and the concept specifying unit specifies the concept of the part, when a plurality of concepts are associated with the instance identical to the item value and the plurality of concepts are in the whole-part relation.

7. The semantic analysis apparatus according to claim 1, wherein the attribute indicates an abstract-concrete relation between the first concept and the second concept and the concept specifying unit specifies the concept of the concrete, when a plurality of concepts are associated with the instance identical to the item value and the plurality of concepts are in the abstract-concrete relation.

8. The semantic analysis apparatus according to claim 1, further comprising:

a concept searching unit that searches the concept storing unit for the same concept as the concept included in the data obtained by the data obtaining unit, when the data obtained by the data obtaining unit includes information indicating the concept corresponding to the item name;

an instance searching unit that searches the concept storing unit for an instance identical to the item value corresponding to the item name from among the instances which are associated with the same concept detected by the concept searching unit; and an instance adding unit that adds the item value as an instance in association with the detected concept when an instance identical to the item value is not detected.

9. The semantic analysis apparatus according to claim 1, further comprising:

a concept extracting unit that extracts information indicating a concept corresponding to the data obtained by the data obtaining unit from the data; and a search target specifying unit that specifies the concepts which are associated with the extracted concept corresponding to the data as a search target in the concept storing unit, according to the attribute associated with the extracted concept, when the concept corresponding to the data is extracted, wherein the concept specifying unit specifies the concept for the item name from the concepts specified as the search target.

10. The semantic analysis apparatus according to claim 9, wherein the concept extracting unit extracts the concept from meta data of the obtained data.

11. The semantic analysis apparatus according to claim 9, wherein the concept extracting unit extracts the concept from a Uniform Resource Locator when the Uniform Resource Locator is included in the obtained data.

12. The semantic analysis apparatus according to claim 1, further comprising:

an obtained data concept storing unit that stores data identifying information which identifies the data to be obtained by the data obtaining unit, and the concept of the data in association with the concept; and a search target specifying unit that specifies the concept, which is associated with the data identifying information of the obtained data, in the obtained data concept storing unit, and that specifies the concept, which is associated with the specified concept, as a search target according to the attribute of the specified concept, wherein the concept specifying unit specifies the concept corresponding to the item name, from the concepts specified as the search target.

13. The semantic analysis apparatus according to claim 1, wherein the concept specifying unit further includes a search target specifying unit which, when a concept corresponding to other item name included in the data is already specified, specifies the concept, which is related to the already specified concept according to the attribute of the already specified concept, as search target, and the concept specifying unit specifies the concept for the item name from the concepts specified as the search target.

14. The semantic analysis apparatus according to claim 13, wherein the search target specifying unit further specifies the concept other than the already specified concept as the search target.

15. A semantic analysis method executed by a computer comprising:

obtaining data using the computer in which an item name and an item value belonging to the item name are represented in a predetermined data format;

extracting the item value from the data based on the data format of the obtained data;

selecting and specifying a concept, which is stored in a concept storing unit, and which is associated with an instance which at least partially matches with a character string of the extracted item value, as the concept for the item name, the concept storing unit storing concepts and instances in association with each other, wherein the concept is a semantic notion to be attached to the item name and the instance is specific data of the concept; and associating the concept with the item name; wherein' the concept storing unit further stores attributes associated with the concepts, including an attribute indicating a relation between a first concept and a second concept of the concepts; and the selecting and specifying further includes determining an order of comparison of the concepts based on the attributes which are associated with the concepts in the concept storing unit, comparing the instance which is associated with one of the concepts in the concept storing unit and the item value which is extracted by the item value extracting unit according to the order of comparison, and specifying the instance which is identical to the item value.

16. A computer program product having a non-transitory computer readable storage medium storing programmed instructions for performing a semantic analysis process, wherein the instructions, when executed by a computer, cause the computer to perform:

obtaining data in which an item name and an item value belonging to the item name are represented in a predetermined data format;

extracting the item value from the data based on the data format of the obtained data;

selecting and specifying a concept, which is stored in a concept storing unit, and which is associated with an instance which at least partially matches with a character string of the extracted item value, as the concept for the item name, the concept storing unit storing concepts and instances in association with each other, wherein the concept is a semantic notion to be attached to the item name and the instance is specific data of the concept; and associating the concept with the item name; wherein' the concept storing unit further stores attributes associated with the concepts, including an attribute indicating a relation between a first concept and a second concept of the concepts; and the selecting and specifying further includes determining an order of comparison of the concepts based on the attributes which are associated with the concepts in the concept storing unit, comparing the instance which is associated with one of the concepts in the concept storing unit and the item value which is extracted by the item value extracting unit according to the order of comparison, and specifying the instance which is identical to the item value.

* * * * *

UNITED STATES PATENT AND TRADEMARK OFFICE
CERTIFICATE OF CORRECTION

| | | |
|---|---|---|
| PATENT NO. | : 7,953,592 B2 | Page 1 of 1 |
| APPLICATION NO. | : 11/362224 | |
| DATED | : May 31, 2011 | |
| INVENTOR(S) | : Kawamura et al. | |

It is certified that error appears in the above-identified patent and that said Letters Patent is hereby corrected as shown below:

Claim 15, column 12, line 52, change "; wherein'" to --; wherein:--.

Claim 16, column 14, line 1, change "; wherein'" to --; wherein:--.

Signed and Sealed this
Thirtieth Day of August, 2011

David J. Kappos
*Director of the United States Patent and Trademark Office*